Patented Feb. 27, 1940

2,191,824

UNITED STATES PATENT OFFICE 2,191,824

MANUFACTURE OF AZO DYESTUFFS AND PROCESS OF DYEING TEXTILE MATERIALS THEREWITH

Hans Krzikalla and Wolfgang Alt, Ludwigshafen-on-the-Rhine, Germany, assignors to General Aniline & Film Corporation, a corporation of Delaware No Drawing. Application December 3, 1937, Serial No. 177,916. In Germany December 29, 1936

7 Claims. (Cl. 8—22)

The present invention relates to azo dyestuffs, a process of producing same, and a process of dyeing textile materials therewith.

We have found that azo dyestuffs having valuable properties are obtained by causing diazo compounds of aromatic amines to react with such ortho-hydroxy-aryl carboxylic acid arylides, capable of coupling, as are substituted at least once in an aryl nucleus of the arylide radicle by a group of the formula —OR, in which R is an aliphatic radicle having at least one free hydroxyl group.

Suitable ortho-hydroxycarboxylic acid arylides are obtained, for example, by causing the following ortho-hydroxycarboxylic acids or their chlorides or esters to react with aromatic amines:—1-hydroxybenzene-2-carboxylic acid, methyl-1-hydroxybenzene - 2 - carboxylic acids, 2-hydroxynaphthalene-3-carboxylic acid, 2-hydroxy-6-methoxynaphthalene-3-carboxylic acid, 2-hydroxyanthracene-3-carboxylic acid, 3-hydroxydiphenylene-oxide-2-carboxylic acid, 2-hydroxytriphenylene-3-carboxylic acid, 2-hydroxycarbazole-3-carboxylic acid and 7.8-benzocarbazole-Bz.3-hydroxy-2-carboxylic acid.

As amines suitable for the preparation of the arylides there may be mentioned, for example, the hydroxyalkoxyaminobenzenes and their substitution products, such as are obtained, for example, by the reaction of equimolecular amounts of nitrophenols with ethylene oxide, ethylenechlorhydrin, epichlorhydrin, propylene oxide, or butylene dioxide and subsequent reduction. Instead of hydroxyalkoxyaminobenzenes, the corresponding hydroxyalkoxy compounds derived from aminonaphthalenes, -diphenyls, -stilbenes and other polynuclear aromatic amines may also be used, in particular amines which contain two or more hydroxyalkoxy groups, as, for example, 4.4'-diamino-3.3' - di - omega - hydroxyethoxydiphenyl. For the preparation of the hydroxycarboxylic acid arylides serving as azo components, there may also be mentoned as being especially suitable the amines prepared from the addition compounds of two, three or more molecules of an alkylene oxide with nitrophenols, nitronaphthols and the like, as, for example, diethylene-glycol-mono-ortho-, -meta- or -para-aminophenyl ether or the amine of the formula:

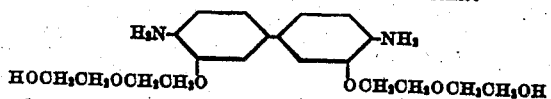

which may be reacted with two molecular proportions of an ortho-hydroxyarylcarboxylic acid.

As diazo components according to this invention there may be mentioned the amines usually employed in the preparation of azo dyestuffs, such as aniline, nitroaminobenzenes, nitroaminophenols, aminodiphenylamines, aminoazobenzenes which, if desired, may contain further substituents, such as halogen, alkyl groups, fluoralkyl groups, alkoxy groups, alkylsulphonic, carboxylic and sulphonic acid radicles.

The azo dyestuffs may be prepared in substance or on the fiber. They may serve for dyeing wool, cotton and viscose artificial silk. The dyestuffs are especially suitable for dyeing mixed fabrics of wool and viscose artificial silk because the azo components, especially when they contain two or more hydroxyl groups in the alkoxy groups of the arylide radicle, have a good solubility even in slightly alkaline or even in neutral media. When preparing the dyestuffs on the fiber, it is preferable to bottom the fabric to be dyed with the hydroxycarboxylic acid arylide and then to treat it with a diazonium solution.

It is already known to prepare dyestuffs by coupling diazotized aromatic amines with hydroxyarylcarboxylic arylides containing in the arylide radicle a hydroxyalkyl ether group. The new dyestuffs, when prepared in substance, are considerably faster to mineral and vegetable oils than the known dyestuffs. When preparing the dyestuffs on the fiber, the present process is distinguished from the known one in that the coupling components used may be dissolved more easily, faster and while applying less amounts of alkali than the coupling components used in the known process.

The following examples will further illustrate how our invention may be carried out in practice but the invention is not restricted to these examples.

Example 1

3 grams of the hydroxycarboxylic acid arylide of the formula:

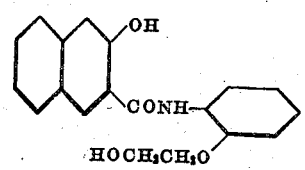

are dissolved in a small amount of hot alcohol and the solution added in small portions to a solution, heated to 80° C., of 5 grams of the addition compound of 15 molecular proportions of ethylene oxide to octadecyl alcohol in 1 liter of water. At the same time such an amount of dilute caustic soda solution is added that any milky cloudiness occurring is converted into a pure yellow solution. After the whole has been added, the solution has a weak alkaline reaction to phenolphthalein. The whole is then rapidly cooled to 60° C. and a fabric of cotton or viscose artificial silk or a previously wetted mixed fabric of 70 per cent of wool and 30 per cent of viscose artificial silk is introduced into the solution and moved therein for half an hour. After squeezing off, the fabric is treated for half an hour with a neutral solution of diazotized 4-chlor-2-nitro-1-aminobenzene, a brilliant red dyestuff thus being obtained on the fiber. The fabric is then treated with a soap solution at the boiling point or, in the case of the mixed fabric, advantageously at 70° C. The dyeings have excellent fastness properties.

Similar dyeings are obtained by using hydroxycarboxylic acid arylides containing the hydroxyethyloxy group in the meta- or para-positions to the amide group instead of in the ortho-position.

*Example 2*

4 grams of the hydroxycarboxylic acid arylide having the formula:

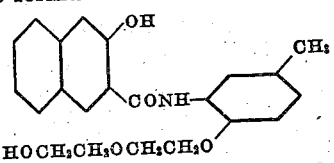

are triturated with a small amount of alcohol and poured into a solution, heated to 80° C., of 25 cubic centimeters of normal sodium carbonate solution in 1 liter of water. The clear, pale yellow solution is cooled rapidly to 30° C. and a fabric of wool or cotton or a mixed fabric of 70 per cent of wool and 30 per cent of viscose artificial silk is introduced into the solution and moved therein for half an hour. After squeezing off, the fabric is treated for half an hour at room temperature with a neutral solution of diazotized 4-amino-4'-methoxy-diphenylamine. A dark blue dyestuff is obtained on the fiber. After treatment with soap, the dyeings have excellent fastness properties.

*Example 3*

2 grams of the hydroxycarboxylic acid arylide having the formula:

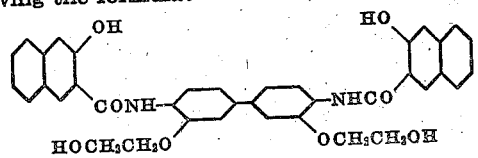

are dissolved in 50 cubic centimeters of water while adding 4 cubic centimeters of caustic soda solution of 40° Baumé strength and while warming, the solution being made up to 1 liter with water. A fabric of cotton or viscose artificial silk is moved in the solution for half an hour. After squeezing off, the fabric is treated for half an hour with a solution of the diazonium salt of 2.5-dichlor-1-aminobenzene. A brilliant brown disazo dyestuff is obtained. The dyeings have excellent fastness properties after alkaline soaping at the boiling point.

Very fast dyestuffs are also obtained by using as the azo component, instead of the said hydroxycarboxylic acid arylide, those containing the radicle

or

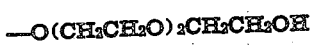

instead of the radicle —OCH₂CH₂OH.

*Example 4*

1 gram of the hydroxycarboxylic acid arylide of the formula:

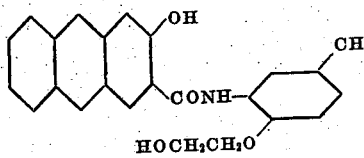

is dissolved in a small amount of warm water while adding 2 cubic centimeters of caustic soda solution of 40° Baumé strength, the solution then being made up to 1 liter with water. A fabric of cotton or viscose artificial silk is moved in the solution for half an hour. After squeezing off, it is treated with a solution of diazotized 4-amino-3-methoxydiphenylamine, a green dyestuff thus being obtained. The dyeings have excellent fastness properties after alkaline soaping at the boiling point.

*Example 5*

5 grams of the hydroxycarboxylic acid arylide having the formula:

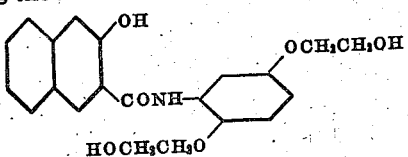

are dissolved in a small amount of alcohol and the solution added to a liter of water, care being taken by the addition of a weak base (such as ammonia, sodium carbonate or aliphatic amines) that no cloudiness occurs. A mixed fabric of 70 per cent of wool and 30 per cent of viscose artificial silk is moved in the solution for half an hour. After squeezing off, the fabric is treated for half an hour with a neutral solution of diazotized 5-nitro-2-amino-1-methylbenzene, a red dyestuff thus being formed. The dyeing has good fastness properties after a soap treatment at 70° C.

Similar dyestuffs are obtained by using hydroxycarboxylic acid arylides containing the radicle

or

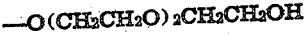

instead of the radicle —OCH₂CH₂OH. By using an arylide containing two radicles of the formula —O(CH₂CH₂O)₄CH₂CH₂OH it is possible to carry out the preparation of the azo dyestuff in neutral solution.

The preparation of the dyestuff may also be effected by dissolving the sodium salt of the hydroxycarboxylic acid arylide in water with the addition of a small amount of ammonia. The said solutions react neutral to phenolphthalein.

*Example 6*

An ice-cooled tetrazo solution derived from 0.5 molecular proportion of 4.4'-diamino-3-3'-dimethoxydiphenyl is allowed to flow at from 0° to 10° C. into a solution of 1 molecular proportion of the hydroxycarboxylic acid arylide of the formula:

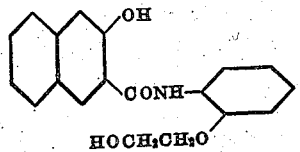

1 molecular proportion of sodium hydroxide and 1.5 molecular proportions of sodium carbonate in water. The resulting disazo dyestuff separates as a blue water-insoluble powder. After stirring for 12 hours and heating to 60° C. for an hour, the dyestuff is filtered off by suction, washed with warm sodium carbonate solution and water and dried in vacuo at 40° C. The dyestuff is entirely insoluble in water and hydrocarbons and is eminently suitable as a pigment dyestuff.

If, under the same conditions, 1 molecular proportion of the arylide of the formula:

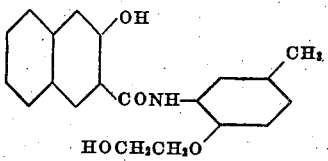

be reacted with the diazo compound derived from 1 molecular proportion of 4-chlor-2-nitro-1-aminobenzene, a red dyestuff is obtained which is insoluble in water and oils and has an excellent fastness to sublimation.

If the diazo compounds of amines containing sulphonic acid groups, such as 1-aminobenzene-4-sulphonic acid, be used instead of the said diazo compound, water-soluble azo dyestuffs are obtained which dye wool fast shades.

*Example 7*

6 grams of the arylide corresponding to the formula

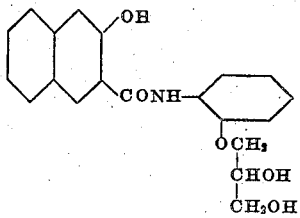

are mixed with 30 ccm. of alcohol, 18 ccm. of a 25 per cent aqueous ammonia solution, and 6 grams of the addition product of 20 molecular proportions of ethylene oxide to 1 molecular proportion of an oleyl alcohol. The whole is slightly heated, stirred into water of 50° C., the solution being made up to 1 liter, with water.

A fabric of 70 per cent of wool and 30 per cent of viscose artificial silk is moved in this solution for half an hour at 25° C., after having added thereto 10 grams of common salt. After squeezing off, the fabric is moved for half an hour at room temperature in a neutral solution of diazotized 4-amino-4'-methoxydiphenylamine. After quick rinsing, the fabric is treated for half an hour at 90° C. in an aqueous bath, containing 3 grams of Marseilles soap per liter. Blue dyeings are obtained which are excellently fast to light and show good fastness to washing and fulling.

*Example 8*

5 grams of the arylide corresponding to the formula

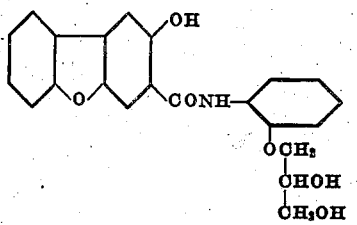

are boiled for a short time with 30 ccm. of alcohol and 50 ccm. of a 25 per cent aqueous ammonia solution, the solution being made up to 1 liter with water, while simultaneously adding a small amount of sulfite cellulose waste liquor. A viscose fabric is treated in this bath for half an hour at 50° C., squeezed off and moved for half an hour in a neutral solution of diazotized 2.5-dichlor-1-aminobenzene. Very fast brown dyeings are thus obtained.

What we claim is:

1. Azo dyestuffs corresponding to the general formula

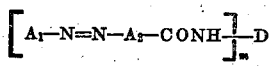

wherein $A_1$ stands for an aromatic radicle, $A_2$ for the radicle of an ortho-hydroxyaryl carboxylic acid amide, $m$ for a whole number up to 2, and D for an aryl radicle substituted at least once in the aryl nucleus by a group of the formula

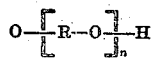

wherein R represents a low molecular alkylene radicle and $n$ a whole number.

2. Azo dyestuffs corresponding to the formula

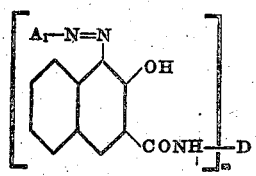

wherein $A_1$ stands for an aryl radicle, $m$ for a whole number up to 2, and D for an aryl radicle substituted at least once in the aryl nucleus by a group of the formula

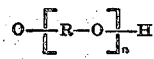

wherein R represents a low molecular alkylene radicle and $n$ a whole number.

3. Azo dyestuffs corresponding to the general formula A—N=N—B wherein A stands for an aromatic radicle free from water-solubilizing groups, wherein B stands for the radicle of a 2.3-hydroxynaphthoic acid anilide substituted at least once in the benzene nucleus of the anilide radicle by a group of the formula

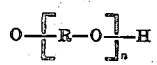

wherein R represents a low molecular alkylene radicle and $n$ a whole number.

4. The azo dyestuff of the formula

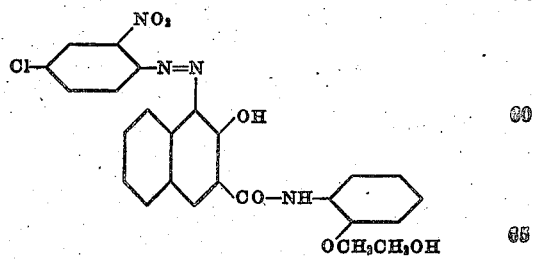

5. The azo dyestuff of the formula

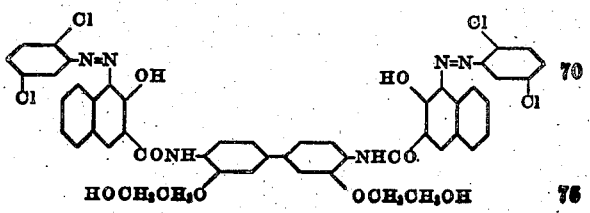

6. The azo dyestuff of the formula

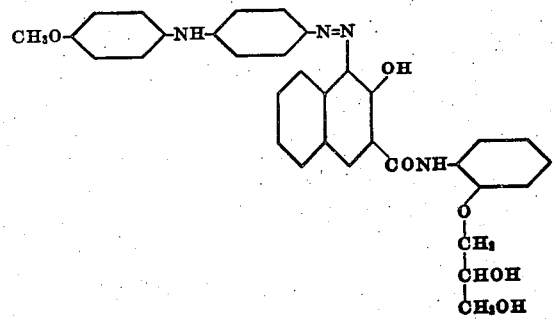

7. A process of producing fast dyeings on textile material containing both wool and viscose artificial silk which comprises applying to said material an ortho-hydroxyaryl carboxylic arylide capable of being coupled and being substituted at least once in an aryl nucleus of the arylide radicle by a group of the formula

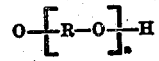

in which R represents a low molecular alkylene radicle and $n$ a whole number, converting said arylides into azo dyestuffs by treatment with diazotized aromatic amines.

HANS KRZIKALLA.
WOLFGANG ALT.